(12) United States Patent
Iizuka et al.

(10) Patent No.: US 6,556,348 B1
(45) Date of Patent: Apr. 29, 2003

(54) MULTIBEAM OPTICAL SYSTEM

(75) Inventors: Takashi Iizuka, Saitama-ken (JP); Masato Noguchi, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/662,635

(22) Filed: Sep. 15, 2000

(30) Foreign Application Priority Data

Sep. 16, 1999 (JP) ............................................. 11-261470

(51) Int. Cl.[7] ................................................. G02B 5/18
(52) U.S. Cl. ........................ 359/569; 359/571; 359/574
(58) Field of Search ................................ 359/566, 569, 359/571, 574

(56) References Cited

U.S. PATENT DOCUMENTS

| | | | |
|---|---|---|---|
| 6,021,000 A | 2/2000 | Iizuka et al. ................. | 359/574 |
| 6,130,782 A | 10/2000 | Iizuka et al. ................. | 359/619 |
| 6,178,028 B1 * | 1/2001 | Washiyama et al. ......... | 359/204 |

FOREIGN PATENT DOCUMENTS

JP          10-78504          3/1998

OTHER PUBLICATIONS

Rockwell Laser Industries, The Argon Gas Laser System, 2000. [retrieved on Jan. 21, 2002]. Retrieved from the Internet: <http://www.rli.com/argon.html> p. 1 of 2.*

* cited by examiner

*Primary Examiner*—Cassandra Spyrou
*Assistant Examiner*—Alessandro V. Amari
(74) *Attorney, Agent, or Firm*—Greenblum & Bernstein, P.L.C.

(57) ABSTRACT

A multibeam optical system that employs a multiline laser source emitting a laser beam at predetermined wavelengths, such as, for example, at wavelengths 488.0 nm and 514.5 nm, and a diffractive beam-dividing element having diffractive grating to divide the incident beam into nine diffracted beams. A design wavelength $\lambda_M$ of the diffraction grating, at which the light quantity of the incident beam is equally distributed among the plurality of diffracted beams, is determined so as to satisfy the condition 488.0 nm$<\lambda_M<$514.5 nm. When the design wavelength $\lambda_M$ is 501.1 nm, the light quantities of the divided beams, which are the sums of the quantities of the peak wavelengths 488.0 nm and 514.5 nm, become nearly equal to one another among the nine diffraction orders. As a result, the distribution of the light quantities among the diffracted beams are balanced.

9 Claims, 5 Drawing Sheets

MULTIBEAM OPTICAL SYSTEM

BACKGROUND OF THE INVENTION

The present invention relates to a multibeam optical system that divides a laser beam emitted from a laser source into a plurality of beams and directs the beams toward an object surface such as a photosensitive medium. Particularly, the invention relates to the optical system that employs a diffractive beam-dividing element to divide a laser beam emitted from a multiline laser source.

The multibeam optical system needs a beam-dividing element that divides a laser beam emitted from a laser source into a plurality of beams to form a plurality of beam spots on the object surface.

A conventional multibeam optical system has employed a prism-type beam splitter as the beam-dividing element, which comprises a plurality of prism blocks cemented to one another. The cemented faces of the prism blocks are provided with multi-layer coatings having the desired reflecting properties, respectively.

However, when employing a prism-type beam splitter, when each one of the multi-layer coatings can divide an incident beam only into two separate beams, the number of prism blocks corresponding to the required number of separate beams must be cemented to one another, and when cementing one block to another block, a positional error between two blocks unavoidably arises. Accordingly, when a large number of separate beams are required, the deviations of the beam spots on the object surface tend to become large due to an accumulation of positional errors between the cemented prism blocks.

SUMMARY OF THE INVENTION

It is therefore an object of the present invention to provide an improved multibeam optical system capable of reducing the deviations of the beam spots caused by the positional error of the prism blocks.

For the above object, according to the present invention, a diffractive beam-dividing element is used in place of a prism-type beam splitter. The diffractive beam-dividing element has a diffraction grating formed on a transparent plate and divides the incident laser beam by means of diffraction. Since the diffractive beam-dividing element is made of a single block that is not cemented, it does not generate any positional error even when the large number of the separate beams are required The diffractive beam-dividing element diffracts the incident beam to be divided into a plurality of diffracted beams exiting at the different diffraction angles, respectively. The diffractive beam-dividing element is designed such that the light quantity of the incident beam is equally distributed among the plurality of diffracted beams at a predetermined design wavelength.

However, when employing the diffractive beam-dividing element, the distribution of the light quantity is affected by the wavelength of the incident beam and the light quantity of the incident beam cannot be equally distributed when the wavelength of the incident beam is different from the design wavelength, which causes an imbalance among the light quantities of the diffracted beams.

For example, when the optical system employs a multiline laser such as an argon laser that emits light at a plurality of peak wavelengths, the optical system loses the balance among the light quantities of the diffracted beams, because at least one peak wavelength of the incident beam is different from the design wavelength. Therefore, in order to equally distribute the light quantity of the incident beam by the diffractive beam-dividing element, it has been required to place a filter for passing a beam component of a selected peak wavelength before the diffractive beam-dividing element. Thus, the beam components of peak wavelengths other than the selected peak wavelength are cut off by the filter, which results in low energy efficiency.

The present invention further aims to provide an improved multibeam optical system capable of equally distributing the light quantity among the diffracted beams even when the multiline laser source and the diffractive beam-dividing element are employed, with high energy efficiency.

For the above object, according to the present invention, there is provided a multibeam optical system, which includes a multiline laser source that emits light at a plurality of peak wavelength and a diffractive beam-dividing element having a diffraction grating, satisfying the condition (1);

$$\lambda_S < \lambda_M < \lambda_L. \tag{1}$$

where $\lambda_S$ the shortest wavelength among the plurality of peak wavelengths, $\lambda_L$ is the longest wavelength among the plurality of peak wavelengths, and $\lambda_M$ is a design wavelength of the diffraction grating at which the light quantity of the incident beam is equally distributed among the plurality of diffracted beams The diffraction grating has a corrugated surface consisting of a plurality of periodical phase patterns arranged in parallel at a predetermined fixed pitch.

Since the wavelengths $\lambda_S$ and $\lambda_L$ are different from the design wavelength $\lambda_M$, the light quantity of the incident beam of the wavelengths $\lambda_S$ and $\lambda_L$ is unevenly distributed by the diffraction grating. In the specification, "relative light quantity" is a light quantity of the diffracted beam when the light quantity of the incident beam is defined as 1. Further the value subtracting relative light quantity of the diffracted beam at the design wavelength $\lambda_M$ from the relative light quantity of a diffracted beam at a predetermined wavelength is referred to as a "quantity deviations" at the predetermined wavelength.

When the condition (1) is satisfied, a quantity deviation at the wavelength $\lambda_S$ has an inverse sign of a quantity deviation at the wavelength $\lambda_L$ in every diffraction order. That is, when the quantity deviation at the wavelength $\lambda_S$ in a predetermined diffraction order is larger than zero, the quantity deviation at the wavelength $\lambda_L$ in the same diffraction order is smaller than zero. The converse is also true.

Therefore, the quantity deviations at the wavelengths $\lambda_S$ and $\lambda_L$ cancel each other out, which reduces the imbalance of the distribution among the light quantities of the plurality of diffracted beams.

Further, the diffraction grating in the multibeam optical system of the invention can be defined so as to satisfy the following conditions (2) and (3);

$$SD_N < SD_S \tag{2}$$

$$SD_N < SD_L \tag{3}$$

where $SD_S$ is the standard deviation, i.e., the square root of the variance, of the light quantity of the diffracted beams by the diffractive beam-dividing element at the shortest peak wavelength $\lambda_S$ among the plurality of peak wavelengths;

$SD_L$ is the standard deviation of the diffracted beams by the diffractive beam-dividing element at the longest peak wavelength $\lambda_L$ among the plurality of peak wavelengths; and $SD_N$ is the standard deviation of the diffracted beams by the diffractive beam-dividing element at the peak wavelength $\lambda_N$ that satisfies $\lambda_S<\lambda_N<\lambda_L$.

When the conditions (2) and (3) are satisfied, a variation of the light quantities of the diffracted beams of the wavelength $\lambda_N$ is smaller than variations of the light quantities of diffracted beams of the wavelengths $\lambda_S$ and $\lambda_L$. In the other words, the wavelength $\lambda_N$ is close to the design wavelength $\lambda_M$ of the diffraction grating Therefore, the quantity deviations at the wavelengths $\lambda_S$ and $\lambda_L$ cancel each other out in the same manner as described above.

When the incident beam on the diffractive beam-dividing element consists of two wavelengths, which are the longest wavelength $\lambda_L$ and the shortest wavelength $\lambda_S$, it is easier to balance the light quantities at the respective diffraction orders than the case where the incident beam consists of three or more wavelengths.

The diffractive beam-dividing element may divide the incident beam such that the quantities of the diffracted beams, which are the sums of the quantities of the plurality of peak wavelengths, become nearly equal to one another Alternatively, the diffractive beam-dividing element may divide the incident beam such that exposure values on a photosensitive medium to be irradiated by the diffracted beams become nearly equal to one another when taking the spectral sensitivity of the photosensitive medium into account. The exposure value is the product of the spectral sensitivity of the photosensitive medium and the light quantity of the corresponding peak wavelength.

DESCRIPTION OF THE ACCOMPANYING DRAWINGS

FIG. 2 (B) is an enlarged view of a portion of FIG. 2 (A).

DESCRIPTION OF THE EMBODIMENTS

Figures 1A, 1B:
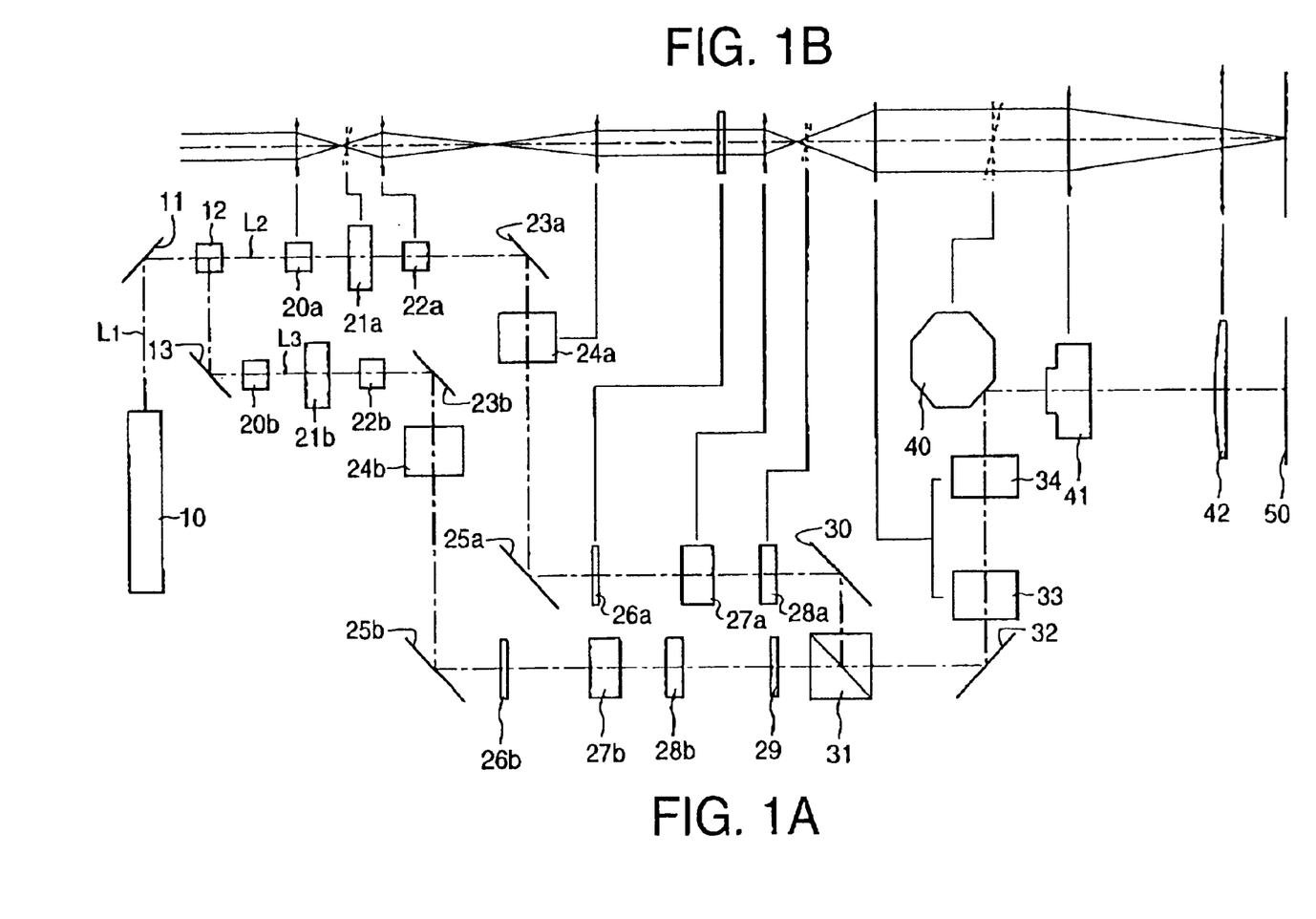
FIG. 1(A) shows an arrangement of optical elements of a multibeam scanning exposure device of the present invention in a main scanning direction.
FIG. 1(B) shows the arrangement of the optical elements in an auxiliary scanning direction, embodying the invention.
Figure 2A:
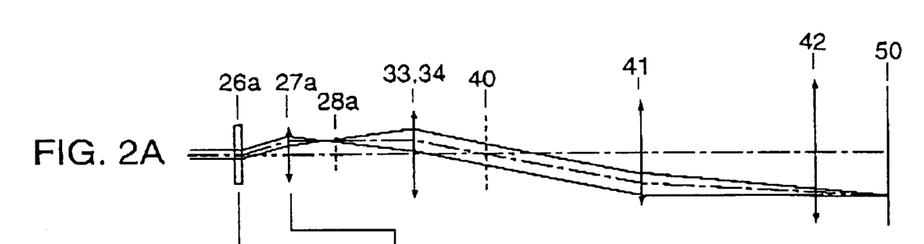
FIG. 2(A) shows a light path in the optical system shown in FIG. 1(B)
Figure 2B:
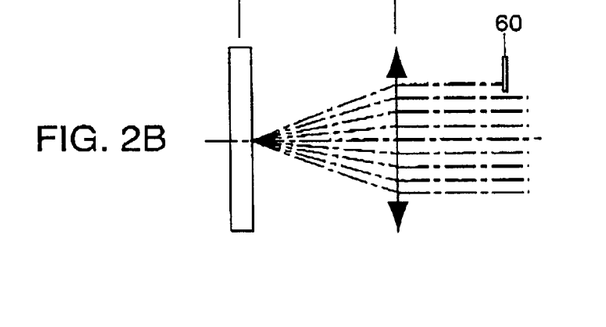

FIGS. 1(A) and 1(B) show an arrangement of optical elements of a multiple scanning exposure device embodying the invention. FIG. 1(A) is a view in a main scanning direction and FIG. 1(B) is an outline view in an auxiliary scanning direction. The main scanning direction is defined as a direction along which laser beams scan on a photosensitive medium, the auxiliary scanning direction is perpendicular to the main scanning direction on the photosensitive medium. Further, FIG. 2(A) shows an optical path of one of the diffracted beams in the device of the embodiment, FIG. 2(B) is an enlarged view of a part of the FIG. 2(A).

As shown in FIG. 1(A), the optical system of the multi-beam scanning exposure device includes a multiline laser source 10 such as an argon laser for emitting a laser beam L1, a half mirror prism 12 for dividing the laser beam L1 into two beams L2 and L3, a pair of diffractive beam-dividing elements 26a and 26b for dividing the beams L2 and L3 into nine beams respectively, a pair of multichannel (eight-channel) acousto-optic modulators (AOM's) 28a and 28b for independently modulating eight of nine beams respectively, a polarizing beam combiner 31 for combining the sixteen beams, and a scanning optical system that contains a polygon mirror 40 and an fθ lens 41. The sixteen beams are deflected by the polygon mirror 40 and form sixteen scanning beam spots on a photosensitive medium 50 through the fθ lens 41.

The beam spots scan on the photosensitive medium 50 in the main scanning direction that is parallel to the paper face of FIG. 1(A), and the photosensitive medium 50 is driven in the auxiliary scanning direction that is perpendicular to the paper face of FIG. 1(A). As a result, two-dimensional exposure patterns are formed on the photosensitive medium 50.

Details of the optical system will be described hereinafter with reference to FIGS. 1(A), 1(B), 2(A) and 2(B).

The laser source 10 emits the laser beam L1 having a plurality of peak wavelengths. In this embodiment, 488.0 nm and 514.5 nm are used as practical wavelengths; however it is understood that other wavelengths may be used without departing from the spirit and/or scope of the invention. The laser beam L1 emitted from the laser source 10 is reflected by a mirror 11 to be incident on the half mirror prism 12. The beam L2 passing through the half mirror prism 12 is converged by a first lens 20a having a positive refractive power, and is incident on the AOM 21a located at the rear side of the converged point of the beam along a beam propagating direction as shown in FIG. 1(B). The AOM 21a controls an exit angle therefrom to correct a positioning error of the beam spots on the photosensitive medium 50 due to a facet error of the reflecting surfaces of the polygon mirror 40. The divergent exit beam from the AOM 21a is converged by a second lens 22a having a positive refracting power. The beam from the second lens is reflected by a mirror 23a, and then the beam is incident on a third lens 24a having a positive refractive power to collimate the incident beam.

The collimated beam through the third lens 24a is reflected by a mirror 25a to be incident onto the diffractive beam-dividing element 26a. The diffractive beam-dividing element 26a is provided with a diffraction grating that diffracts the incident beam to be divided into nine diffracted beams. The incident single beam is diffracted and divided in the auxiliary scanning direction into nine beams by the diffractive beam-dividing element 26a as shown in FIG. 2(B). The nine diffracted beams are converged by a fourth lens 27a having a positive refractive power. One of the nine beams exiting from the fourth lens 27a is shaded by a shading plate 60 (see FIG. 2(B)) and the other eight beams are incident on the multichannel AOM 28a. The diffractive beam-dividing element 26a is located at the front focal point of the fourth lens 27a and the location of the multichannel AOM 28a is substantially coincident with the converged point of the beam.

The multichannel AOM 28a is provided with eight channels each of which changes a direction of an emergent laser beam in response to the input ultrasonic wave. The detail construction of the multichannel AOM is not illustrated because the multichannel AOM is a device that is in general use. In a channel, when the ultrasonic wave is applied to a medium, a diffraction grating is formed by a compression wave caused in the medium. The diffracted beam emerges as the modulated beam, and the non-diffracted beam is cut off by a shading plate. The eight channels of the multichannel AOM 28a are independently controlled to independently modulate the eight beams, i.e., to independently turn ON/OFF the eight beams, respectively.

The exit beams from the multichannel AOM 28a is reflected by the mirror 30 to be incident on the polarizing beam combiner 31 as S-polarized beams and therefore they are reflected by the polarizing beam combiner 31.

Similar optical elements for the beam L2 are arranged along the optical path of the beam L3 that is reflected by the half mirror prism 12. The reflected beam L3 progresses via a first lens 20b, an AOM 21b for correcting the positioning error of the spots, the second lens 22b, a third lens 23b, a third lens 24b, a mirror 25b, the diffractive beam-dividing element 26b and a fourth lens 27b. The exit beams from the fourth lens 27b are incident on the multichannel AOM 28b to be modulated. The modulated beams pass through a half-wave plate 29 and are incident on the polarizing beam combiner 31 as P-polarized light to transmit the polarizing beam combiner 31.

The sixteen divergent beams combined by the polarizing beam combiner 31 are reflected by a mirror 32 and are collimated through fifth and sixth lenses 33 and 34. And then the beams are reflected and deflected by the polygon mirror 40 at the same time. The deflected sixteen beams are focused on the photosensitive medium 50 at the different points in the auxiliary scanning direction respectively through the fθ lens 41 and a condenser lens 42.

Figure 3:
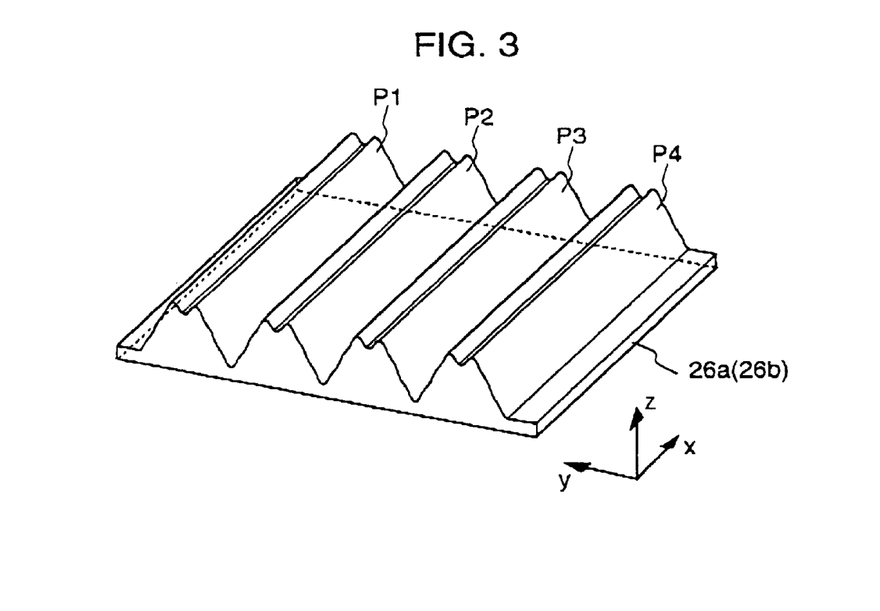
FIG. 3 is an enlarged perspective view of a diffraction grating formed on a diffractive beam-dividing element of the embodiment.

The details of the diffractive beam-dividing elements 26a and 26b will be described hereinafter. Each of the diffractive beam-dividing elements 26a and 26b consist of a transparent substrate made of a glass or resin, and the diffraction grating formed on one surface of the transparent substrate. FIG. 3 is an enlarged perspective view of the diffraction grating formed on the diffractive beam-dividing elements 26a and 26b. The diffraction grating has a corrugated surface having a plurality of periodical phase patterns P1, P2, P3 . . . that are linearly extended in an x-axis direction and are arranged at a predetermined fixed pitch in a y-axis direction. The x-axis direction corresponds the main scanning direction and the y-axis direction corresponds the auxiliary scanning direction. A z-axis is perpendicular to both of the x- and y-axes.

A cross section of the phase pattern in a y-z plane has a shape that causes a non-linear phase difference as the beam passes therethrough within one pitch. There are no phase gaps at the boundaries among the adjacent phase patterns. That is, one phase pattern is smoothly connected to the adjacent phase patterns.

TABLE 1 shows data for defining the shape of the phase pattern of the diffraction grating formed on the diffractive beam-dividing elements 26a and 26b. In TABLE 1, "Coord." (designated 0–63) represents the position in the y-axis direction when the pitch of the phase pattern is divided into 64 coordinates, and "δ" represents a phase difference at the corresponding coordinate with respect to the phase at the lowermost portion (Coord.=0). The phase difference δ is given in radians. In the phase pattern of FIG. 3, the change of the phase difference δ corresponding to the change of the incident point along the y-axis direction is represented by non-linear function.

Figure 4:
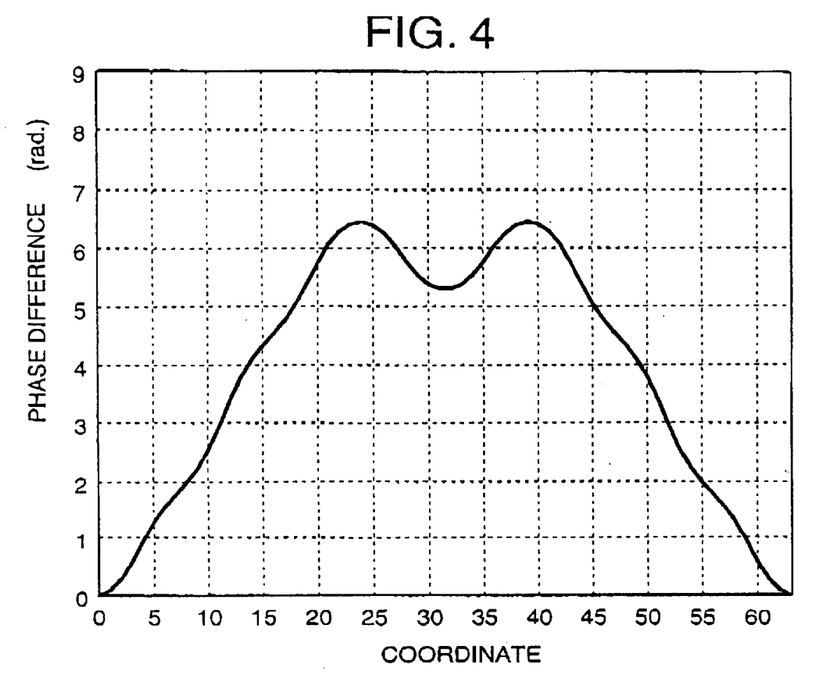
FIG. 4 is a graph showing a phase pattern of the diffraction grating of the embodiment.

The data is shown graphically in FIG. 4 where a vertical axis is the phase difference δ and a horizontal axis is the coordinate in the y-axis direction.

The phase pattern is designed for dividing a single beam into nine beams with optimizing to satisfy the conditions: (a) quantities of all emitted beams are substantially the same, and (b) only the intended number of emitted beams are emitted.

Accordingly, a height H along the z-axis direction (i.e., an actual height of the phase pattern) in micrometers ($\mu$m) may be calculated using the formula:

$$H=\delta \times \lambda/(2\pi(n-1)),$$

where n is a refractive index of the material of the diffractive beam-dividing elements 26a and 26b and λ is a wavelength of the incident beam. In this calculation, it is assumed that the diffractive beam-dividing element is located within air whose refractive index is regarded as 1.

TABLE 1

| Coord. | δ | Coord. | δ | Coord. | δ |
|---|---|---|---|---|---|
| 0 | 0.00000 | 22 | 6.29969 | 43 | 5.74883 |
| 1 | 0.08727 | 23 | 6.42061 | 44 | 5.37594 |
| 2 | 0.28157 | 24 | 6.45338 | 45 | 5.03895 |
| 3 | 0.58121 | 25 | 6.40383 | 46 | 4.77212 |
| 4 | 0.94548 | 26 | 6.26897 | 47 | 4.54875 |
| 5 | 1.28199 | 27 | 6.04448 | 48 | 4.33621 |
| 6 | 1.55363 | 28 | 5.77626 | 49 | 4.09535 |
| 7 | 1.77708 | 29 | 5.53539 | 50 | 3.78851 |
| 8 | 1.98986 | 30 | 5.37669 | 51 | 3.38602 |
| 9 | 2.22728 | 31 | 5.29971 | 52 | 2.93113 |
| 10 | 2.53102 | 32 | 5.29971 | 53 | 2.53102 |
| 11 | 2.93113 | 33 | 5.37669 | 54 | 2.22728 |
| 12 | 3.38602 | 34 | 5.53539 | 55 | 1.98986 |
| 13 | 3.78851 | 35 | 5.77626 | 56 | 1.77708 |
| 14 | 4.09535 | 36 | 6.04448 | 57 | 1.55363 |
| 15 | 4.33621 | 37 | 6.26897 | 58 | 1.28199 |
| 16 | 4.54875 | 38 | 6.40383 | 59 | 0.94548 |
| 17 | 4.77212 | 39 | 6.45338 | 60 | 0.58121 |
| 18 | 5.03895 | 40 | 6.42061 | 61 | 0.28157 |
| 19 | 5.37594 | 41 | 6.29969 | 62 | 0.08727 |
| 20 | 5.74883 | 42 | 6.07744 | 63 | 0.00000 |
| 21 | 6.07744 | — | — | — | — |

It should be noted that the shape of the diffraction grating represented by the phase difference can be determined without consideration of a wavelength. The wavelength is taken in consideration when the actual shape of the diffraction grating is determined. In the other words, in order to determine the actual shape of the diffraction grating, a design wavelength $\lambda_M$ should be determined.

The design wavelength, at which the quantity of the incident beam is equally distributed among the plurality of diffracted beams, is determined so as to satisfy the condition (1);

$$\lambda_S<\lambda_M<\lambda_L, \qquad (1)$$

where $\lambda_S$ is the shortest wavelength among the plurality of peak wavelengths, and $\lambda_L$ is the longest wavelength among the plurality of peak wavelengths.

As described above, the incident beam on the diffractive beam-dividing element has two peak wavelengths, i.e., the shortest wavelength $\lambda_S$ is 488.0 nm and the longest wavelength $\lambda_L$ is 514.5 nm. The design wavelength $\lambda_M$ should satisfy the condition 488.0 nm<$\lambda_M$<514.5 nm.

When the quantities of the wavelengths 488.0 nm and 514.5 nm in the incident beam are the same and the spectral sensitivity of the photosensitive medium 50 is identical for both of the wavelength, the design wavelength $\lambda_M$ is determined such that the quantities of the diffracted beams, which is the sum of the quantities at the two peak wavelengths, become nearly equal to one another. For such a distribution, the design wavelength $\lambda_M$ should be 501.1 nm. The actual shape can be calculated based on the data of TABLE 1 using the formula:

$$H = \delta \times 501.1 \text{ nm}/(2\pi(n-1)).$$

The diffraction grating optimized for wavelength 501.1 nm equally divides the incident beam of the wavelength 501.1 nm into nine diffracted beams. The incident beam of the wavelength 488.0 nm or 514.5 nm is unevenly divided into nine diffracted beams. The quantity deviation at the wavelength 488.0 nm, which is the value subtracting the relative light quantity at the design wavelength 501.1 nm from the relative light quantity at the wavelength 488.0 nm, and the quantity deviation at the wavelength 514.5 nm cancel each other out at every diffraction order, which reduces the imbalance among the total light quantities of the nine diffracted beams. Namely, the quantities of the diffracted beams, which are the sums of the quantities at wavelength 488.0 nm and 514.5 am, at all of the diffracted orders are substantially identical to one another.

Further, according to another definition, the diffraction grating in the multibeam optical system satisfies the following conditions (2) and (3);

$$SD_N < SD_S \quad (2)$$

$$SD_M < SD_L \quad (3)$$

where $SD_S$ is the standard deviation of the beams diffracted by the diffractive beam-dividing element at the shortest peak wavelength $\lambda_S$ among the plurality of peak wavelengths;

$SD_L$ is the standard deviation of the beams diffracted by the diffractive beam-dividing element at the longest peak wavelength $\lambda_L$ among the plurality of peak wavelengths; and $SD_N$ is the standard deviation of the beams divided by the diffractive beam-dividing element at the peak wavelength $\lambda_N$ that satisfies $\lambda_S < \lambda_N < \lambda_L$.

When the conditions (2) and (3) are satisfied, the quantity deviations at the wavelengths 488.0 nm and 514.5 nm cancel each other out at every diffraction orders, which reduces the imbalance among the total light quantities of the nine diffracted beams.

The following TABLE 2 shows the relative light quantities of each diffracted beam exiting from the diffractive beam-dividing element. In TABLE 2, the quantities at wavelengths 501.1 nm, 488.0 nm and 514.5 nm are shown in columns A, B and C, respectively. The rightmost column shows the total values that are sums of the values of the columns B and C. On the bottom row, the standard deviations SD of the quantities of the diffracted beams at the respective wavelengths are indicated. Most of the light quantity of the incident beam is distributed among the nine diffracted beams whose diffraction orders are −4 through 4.

TABLE 2

| Diffraction order | A 501.1 nm | B 488.0 nm | C 514.5 nm | Total B + C− |
|---|---|---|---|---|
| 10 | 0.00059 | 0.00063 | 0.00056 | 0.00119 |
| 9 | 0.00054 | 0.00050 | 0.00056 | 0.00106 |
| 8 | 0.00021 | 0.00028 | 0.00016 | 0.00044 |
| 7 | 0.00021 | 0.00021 | 0.00021 | 0.00042 |
| 6 | 0.00036 | 0.00047 | 0.00028 | 0.00075 |
| 5 | 0.00076 | 0.00161 | 0.00026 | 0.00187 |
| 4 | 0.11031 | 0.12215 | 0.09905 | 0.22120 |
| 3 | 0.11031 | 0.10828 | 0.11144 | 0.21972 |
| 2 | 0.11031 | 0.10917 | 0.11080 | 0.21997 |
| 1 | 0.11031 | 0.09440 | 0.12679 | 0.22119 |
| 0 | 0.11031 | 0.12254 | 0.09814 | 0.22068 |
| −1 | 0.11031 | 0.09440 | 0.12679 | 0.22119 |
| −2 | 0.11031 | 0.10917 | 0.11080 | 0.21997 |
| −3 | 0.11031 | 0.10828 | 0.11144 | 0.21972 |
| −4 | 0.11031 | 0.12215 | 0.09905 | 0.22120 |
| −5 | 0.00076 | 0.00161 | 0.00026 | 0.00187 |
| −6 | 0.00036 | 0.00047 | 0.00028 | 0.00075 |
| −7 | 0.00021 | 0.00021 | 0.00021 | 0.00042 |
| −8 | 0.00021 | 0.00028 | 0.00016 | 0.00044 |
| −9 | 0.00054 | 0.00050 | 0.00056 | 0.00106 |
| −10 | 0.00059 | 0.00063 | 0.00056 | 0.00119 |
| SD | 0.00000 | 0.01025 | 0.01026 | 0.00064 |

Figure 5:
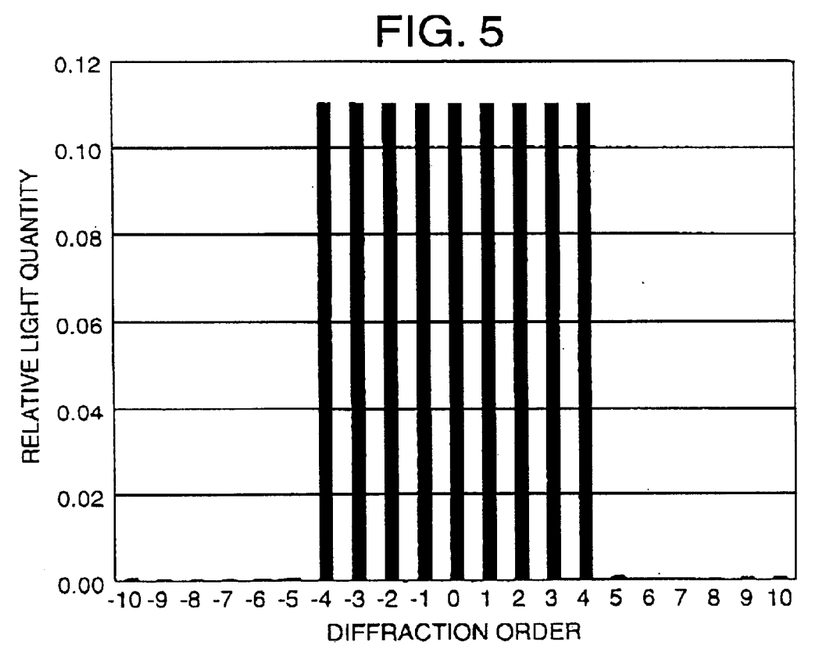
FIG. 5 is a graph showing a distribution of light quantity among light beams diffracted by the diffractive beam-dividing element of the embodiment at the design wavelength.
Figure 6:
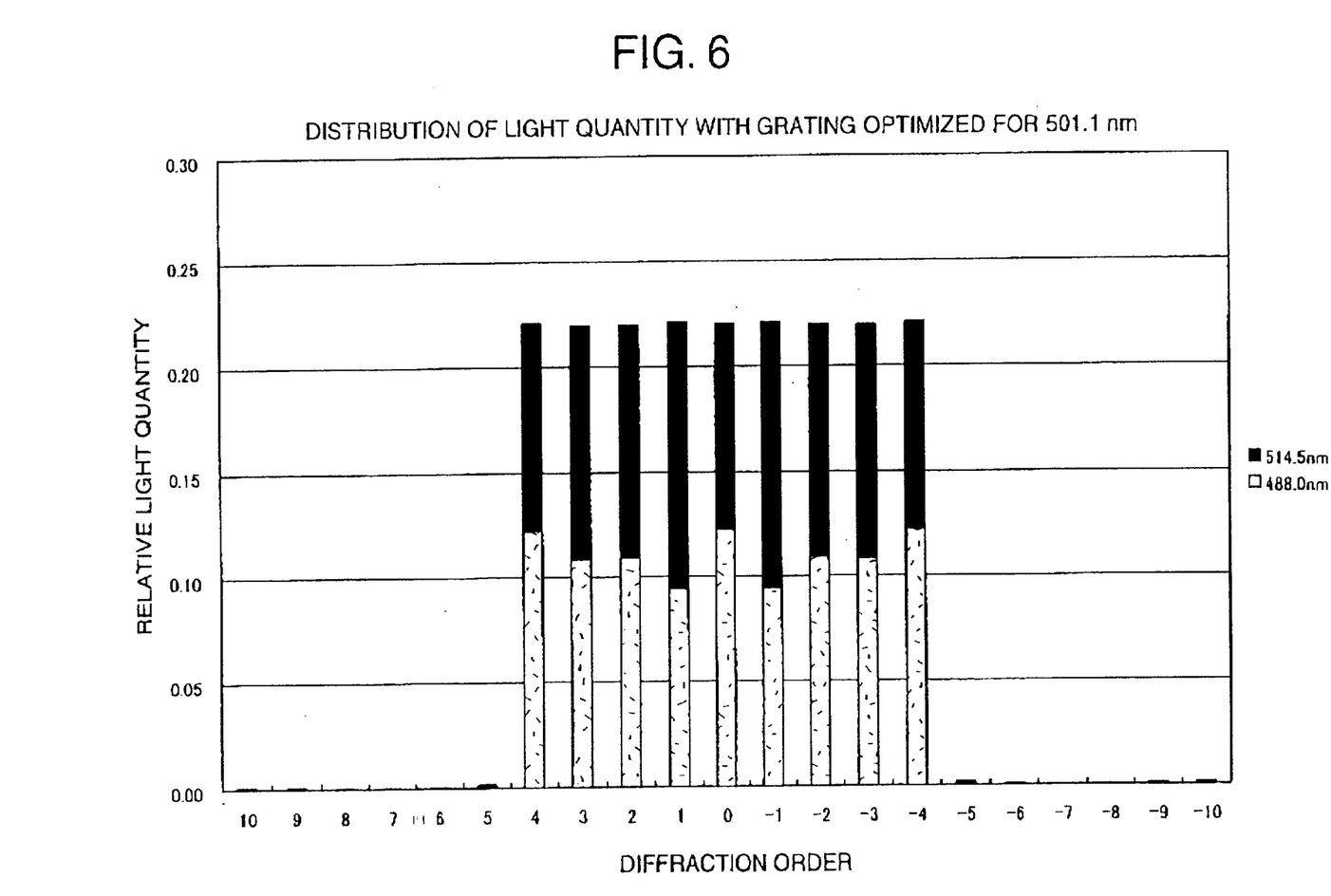
FIG. 6 is a graph showing distributions of light quantities among the beams diffracted by the diffractive beam-dividing element of the embodiment at two practical wavelengths in stacked fashions.

FIGS. 5 and 6 are graphical representations of TABLE 2. The distribution of the relative light quantities of the diffracted beams of the wavelength 501.1 nm is illustrated as a graph shown in FIG. 5. Further, FIG. 6 is a graph showing distributions of the relative light quantities of the diffracted beams of two practical wavelengths 488.0 nm and 514.5 nm in stacked fashions. The horizontal axis of each graph represents the diffraction order and the vertical axis represents the relative light quantity.

By referring to FIG. 6 it has become clear that the total quantities of the two practical wavelengths are the same in the nine diffracted beams. Further, since the standard deviation $SD_S$ at wavelength 488.0 nm is 0.01025, $SD_L$ at wavelength 514.5 nm is 0.01026 and $SD_N$ at wavelength 501.1 nm is 0.00000, the conditions (2) $SD_N < SD_S$ and (3) $SD_N < SD_L$ are satisfied.

Next, another embodiment of the diffraction grating will be described. In this embodiment, the diffraction grating is designed in consideration of variation in spectral sensitivity of the photosensitive medium. In this case, the diffraction grating should divide the incident beam such that exposure values on the photosensitive medium become nearly equal to one another. The exposure value equals the product of the spectral sensitivity of the photosensitive medium and the light quantity of the corresponding peak wavelength.

When the quantities of the wavelengths 488.0 nm and 514.5 nm in the incident beam are the same and the spectral sensitivity of the photosensitive medium at 488.0 nm is twice as high as at 514.5 nm, the diffraction grating should divide the incident beam such that the calculated values, which are sums of 1.333 times of the quantity at 488.0 nm and 0.667 times of the quantity at 514.5 nm, become nearly equal to one another. As a result of this, the exposure values by the respective diffracted beams become nearly equal to one another among all of the nine diffraction orders. For such a distribution, the design wavelength m should be 495.5 nm. The actual shape can be calculated based on the data of TABLE 1 using the formula:

$$H = \lambda \times 495.5 \text{ nm}/(2\pi(n-1)).$$

The shape of the diffraction grating represented by the phase difference in this embodiment is the same as the previous embodiment. The actual height varies depending upon the design wavelength $\lambda_M$.

The diffraction grating optimized for wavelength 495.5 nm equally divides the incident beam of the wavelength 495.5 nm into nine diffracted beams. The incident beam of the wavelength 488.0 nm or 514.5 nm is unevenly divided into nine diffracted beams. However, when the spectral sensitivity of the photosensitive medium is taken in consideration, the total exposure values by the diffracted beams become nearly equal to one another.

The following TABLE 3 shows the relative light quantities of each diffracted beam exited from the diffractive beam-dividing element. In TABLE 3, a column N represents the diffraction order, columns A, B and C represent the quantities at wavelengths 495.5 nm, 488.0 nm and 514.5 nm, respectively, a column D represents the values that are 1.333 times of the values of the column B, a column E represents the values that are 0.667 times of the values of the column C. The rightmost column shows the total values that are sums of the values of the columns D and E. On the bottom row, the standard deviations SD of the quantities of the diffracted beams at the respective wavelengths are indicated.

TABLE 3

| N | A 495.5 nm | B 488.0 nm | C 514.5 nm | D B × 1.333 | E C × 0.667 | Total D + E |
|---|---|---|---|---|---|---|
| 10 | 0.00059 | 0.00061 | 0.00056 | 0.00081 | 0.00037 | 0.00119 |
| 9 | 0.00054 | 0.00052 | 0.00056 | 0.00069 | 0.00037 | 0.00107 |
| 8 | 0.00021 | 0.00024 | 0.00016 | 0.00032 | 0.00011 | 0.00043 |
| 7 | 0.00021 | 0.00021 | 0.00021 | 0.00028 | 0.00014 | 0.00042 |
| 6 | 0.00036 | 0.00041 | 0.00028 | 0.00055 | 0.00019 | 0.00073 |
| 5 | 0.00076 | 0.00114 | 0.00026 | 0.00152 | 0.00017 | 0.00169 |
| 4 | 0.11031 | 0.11617 | 0.09905 | 0.15485 | 0.06607 | 0.22092 |
| 3 | 0.11031 | 0.10941 | 0.11144 | 0.14584 | 0.07433 | 0.22017 |
| 2 | 0.11031 | 0.10983 | 0.11080 | 0.14640 | 0.07390 | 0.22031 |
| 1 | 0.11031 | 0.10226 | 0.12679 | 0.13631 | 0.08457 | 0.22088 |
| 0 | 0.11031 | 0.11644 | 0.09815 | 0.15521 | 0.06547 | 0.22068 |
| −1 | 0.11031 | 0.10226 | 0.12677 | 0.13631 | 0.08456 | 0.22087 |
| −2 | 0.11031 | 0.10983 | 0.11080 | 0.14640 | 0.07390 | 0.22631 |
| −3 | 0.11031 | 0.10941 | 0.11143 | 0.14584 | 0.07432 | 0.22017 |
| −4 | 0.11031 | 0.11617 | 0.09906 | 0.15485 | 0.06607 | 0.22093 |
| −5 | 0.00076 | 0.00114 | 0.00026 | 0.00152 | 0.00017 | 0.00169 |
| −6 | 0.00036 | 0.00041 | 0.00028 | 0.00055 | 0.00019 | 0.00073 |
| −7 | 0.00021 | 0.00021 | 0.00021 | 0.00028 | 0.00014 | 0.00042 |
| −8 | 0.00021 | 0.00024 | 0.00016 | 0.00032 | 0.00011 | 0.00043 |
| −9 | 0.00054 | 0.00052 | 0.00056 | 0.00069 | 0.00037 | 0.00107 |
| −10 | 0.00059 | 0.00061 | 0.00056 | 0.00081 | 0.00037 | 0.00119 |
| SD | 0.00000 | 0.00514 | 0.01026 | — | — | 0.00032 |

Figure 7:
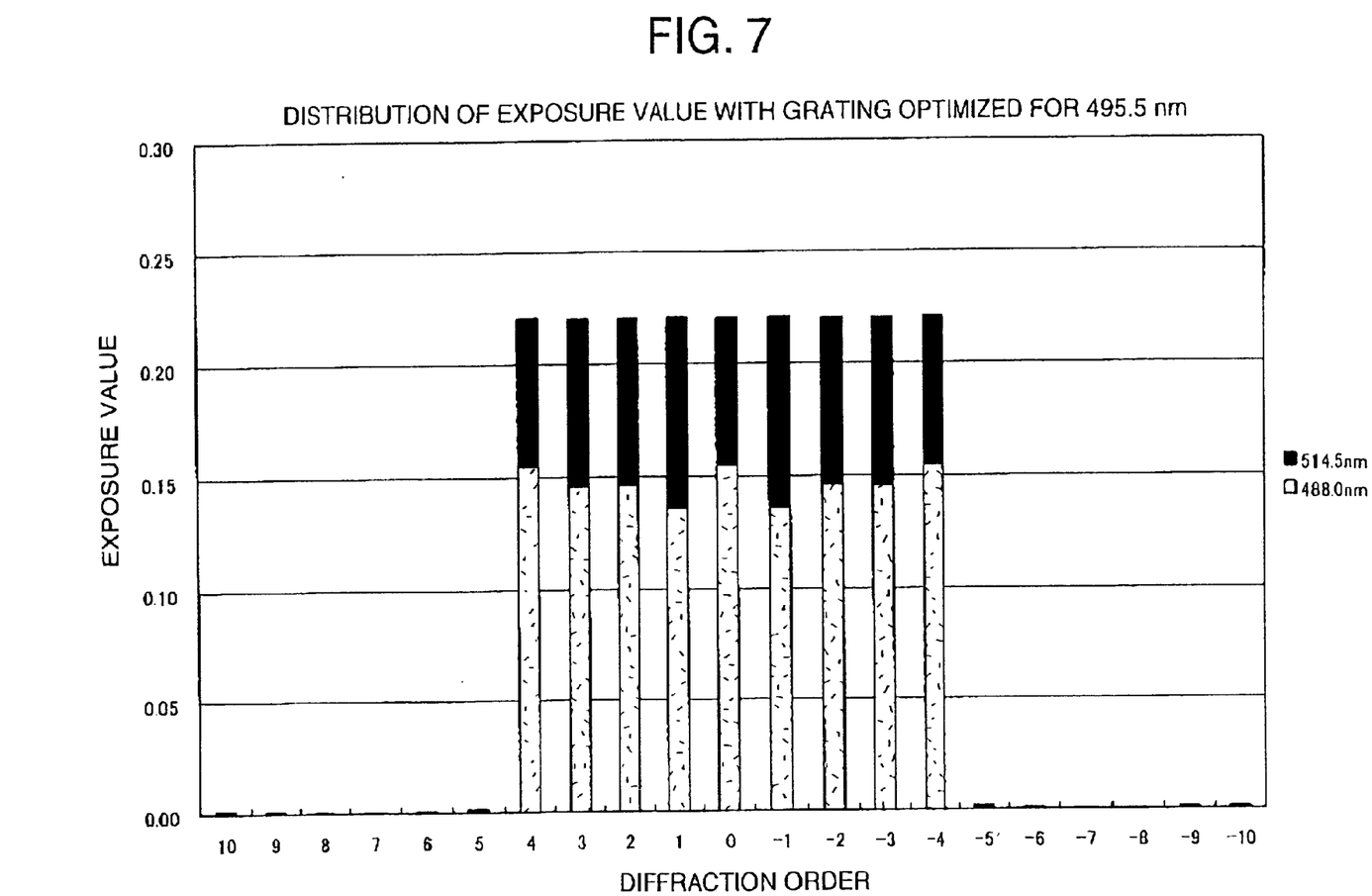
FIG. 7 is a graph showing distributions of exposure values by the beams diffracted by the diffractive beam-dividing element of the other embodiment at two practical wavelengths in stacked fashions.

FIG. 7 is a graphical representation of TABLE 3. FIG. 7 is a graph showing distribution of the values in the column D, i.e., the values that are 1.333 times of the quantities at 488.0 nm, and distribution of the values in the column E, i.e., the values that are 0.667 times of the quantities at 514.5 nm in stacked fashions. The horizontal axis of the graph represents the diffraction order and the vertical axis represents the exposure value.

By referring to FIG. 7 it has become clear that the total exposure values by the two practical wavelengths are the same in the nine diffracted beams. Further, since the standard deviation $SD_S$ at wavelength 488.0 nm is 0.00514, $SD_L$ at wavelength 514.5 nm is 0.01026 and $SD_N$ at wavelength 495.5 nm is 0.00000, the conditions (2) $SD_N<SD_S$ and (3) $SD_N<SD_L$ are satisfied.

In the above embodiments, the diffractive beam-dividing element divides the incident beam into nine diffracted beams, however, the invention can be applied to a diffractive beam-dividing element that divides the incident beam into another numbers of diffracted beams. That is, when the design wavelength $\lambda_M$ is appropriately determined, the diffractive beam-dividing element can divide the incident beam having a plurality of peak wavelengths into the plurality of diffracted beams with desired balance.

The present disclosure relates to the subject matter contained in Japanese Patent Application No. HEI 11-261470, filed on Sep. 16, 1999, which is expressly incorporated herein by reference in its entirety.

What is claimed is:

1. A multibeam optical system, comprising:

a multiline laser source that emits a laser beam having a plurality of peak wavelengths; and a diffractive beam-dividing element that diffracts the laser beam emitted from said laser source into a plurality of diffracted beams exiting at different diffraction angles, respectively, each of the plurality of diffracted beams having different wavelength components, wherein said diffractive beam-dividing element is configured such that the sums of the light quantities of the wavelength components for each diffracted beam, are substantially equal.

2. The multibeam optical system according to claim 1, wherein said diffractive beam-dividing element is provided with a diffraction grating having a corrugated surface consisting of a plurality of periodical phase patterns arranged in parallel at a predetermined fixed pitch, and wherein a design wavelength $\lambda_M$ of said diffraction grating, at which a light quantity of an incident beam is equally distributed among the plurality of diffracted beams, satisfies the condition $\lambda_S<\lambda_M<\lambda_L$, where $\lambda_S$ is the shortest wavelength and $\lambda_L$ is the longest wavelength among said plurality of peak wavelengths.

3. The multibeam optical system according to claim 2, wherein said incident beam on said diffractive beam-dividing element consists of the longest wavelength $\lambda_L$ and the shortest wavelength $\lambda_S$.

4. The multibeam optical system according to claim 2, wherein said diffractive beam-dividing element divides the incident beam such that the light quantities of the diffracted beams, which are a sum of the quantities of the plurality of peak wavelengths, become nearly equal to one another.

5. The multibeam optical system according to claim 2, wherein said diffractive beam-dividing element divides the incident beam such that exposure values on a photosensitive medium to be irradiated by said diffracted beams become nearly equal to one another when taking a spectral sensitivity of said photosensitive medium into account.

6. A multibeam optical system, comprising:

a multiline laser source that emits a laser beam having a plurality of peak wavelengths; and a diffractive beam-dividing element that diffracts the laser beam emitted from said laser source into a plurality of diffracted beams exiting at different diffraction angles, respectively, each of the plurality of diffracted beams having different wavelength components, wherein said diffractive beam-dividing element is configured such that the sums of the light quantities of the wavelength components, for each diffracted beam are substantially equal, and wherein said diffractive beam-dividing element is provided with a diffraction grating having a corrugated surface consisting of a plurality of periodical phase patterns arranged in parallel at a predetermined fixed pitch, and wherein said diffraction grating is designed such that the following conditions are satisfied:

$SD_N<SD_S$ $SD_N<SD_L$ where

SD$_S$ is a standard deviation of the beams diffracted by said diffractive beam-dividing element at the shortest peak wavelength $\lambda_S$ among said plurality of peak wavelengths;

SD$_L$ is a standard deviation of the beams diffracted by said diffractive beam-dividing element at the longest peak wavelength $\lambda_L$ among said plurality of peak wavelengths; and SD$_N$ is the standard deviation of the beams diffracted by said diffractive beam-dividing element at the peak wavelength $\lambda_N$ that satisfies $\lambda_S < \lambda_N < \lambda_L$.

7. The multibeam optical system according to claim 6, wherein said incident beam on said diffractive beam-dividing element consists of the longest wavelength $\lambda_L$ and the shortest wavelength $\lambda_S$.

8. The multibeam optical system according to claim 6, wherein said diffractive beam-dividing element divides the incident beam such that a light quantity of the diffracted beams, which are the sum of the quantities of the plurality of peak wavelengths, become nearly equal to one another.

9. The multibeam optical system according to claim 6, wherein said diffractive beam-dividing element divides the incident beam such that exposure values on a photosensitive medium to be irradiated by said diffracted beams become nearly equal to one another when taking the spectral sensitivity of said photosensitive medium into account.

* * * * *